(12) United States Patent
Tenzer et al.

(10) Patent No.: US 10,424,766 B2
(45) Date of Patent: Sep. 24, 2019

(54) THERMAL INSULATION OF A BATTERY HAVING AN ELEVATED OPERATING TEMPERATURE

(71) Applicant: Robert Bosch GmbH, Stuttgart (DE)

(72) Inventors: Martin Tenzer, Nuertingen (DE); Jean Fanous, Pfullingen (DE); Joerg Poehler, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 15/509,260

(22) PCT Filed: Aug. 5, 2015

(86) PCT No.: PCT/EP2015/068045
§ 371 (c)(1),
(2) Date: Mar. 7, 2017

(87) PCT Pub. No.: WO2016/045854
PCT Pub. Date: Mar. 31, 2016

(65) Prior Publication Data
US 2017/0279092 A1    Sep. 28, 2017

(30) Foreign Application Priority Data
Sep. 22, 2014  (DE) ........................ 10 2014 219 005

(51) Int. Cl.
| | | |
|---|---|---|
| *H01M 2/06* | (2006.01) | |
| *H01M 2/02* | (2006.01) | |
| *H01M 2/04* | (2006.01) | |
| *H01M 2/10* | (2006.01) | |
| *H01M 2/30* | (2006.01) | |
| *H01M 10/0525* | (2010.01) | |
| *H01M 10/058* | (2010.01) | |

(52) U.S. Cl.
CPC ........... *H01M 2/06* (2013.01); *H01M 2/0252* (2013.01); *H01M 2/0447* (2013.01); *H01M 2/1088* (2013.01); *H01M 2/30* (2013.01); *H01M 10/058* (2013.01); *H01M 10/0525* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2011/0045327 A1 | 2/2011 | Yawata et al. | |
| 2012/0079859 A1* | 4/2012 | Lakamraju | E05B 17/0075 70/277 |

FOREIGN PATENT DOCUMENTS

| | | |
|---|---|---|
| DE | 4219912 A1 | 12/1993 |
| DE | 19538003 A1 | 4/1996 |
| DE | 102007059932 B3 | 7/2009 |
| EP | 2551936 A2 | 1/2013 |

OTHER PUBLICATIONS

International Search Report dated Oct. 2, 2015, of the corresponding International Application PCT/EP2015/068045 filed Aug. 5, 2015.

* cited by examiner

*Primary Examiner* — Ladan Mohaddes
(74) *Attorney, Agent, or Firm* — Norton Rose Fulbright US LLP; Gerard Messina

(57) ABSTRACT

A battery housing including at least one interior space for accommodating at least one battery, and including at least one contact element which, in a connection position, establishes a connection to a counter-contact element, the connection passing through the battery housing out of the interior space and/or into the interior space, the connection being cut off in an out-of-contact position with the counter-contact element, the counter-contact element being situated on an insulation component movable relative to the battery housing, which is movable from a first position, in which the counter-contact element and the contact element are in the connection position, into a second position, in which the counter-contact element and the contact element are in the out-of-contact position, the contact element being thermally insulated in the out-of-contact position by the insulation component.

13 Claims, 2 Drawing Sheets

THERMAL INSULATION OF A BATTERY HAVING AN ELEVATED OPERATING TEMPERATURE

FIELD

The present invention relates to a battery housing, a battery-operated device, as well as a method for thermally insulating a battery having an elevated operating temperature.

BACKGROUND INFORMATION

Conventional lithium batteries or lithium-ion batteries may have a polymeric or ceramic solid electrolyte instead of a liquid electrolyte. By reducing the easily combustible liquid electrolyte or by exchanging it entirely for the solid electrolyte, it is possible to significantly improve the safety behavior of the cell. In addition, parasitic secondary reactions, which may occur between the metallic lithium and the liquid electrolyte, are prevented.

In order, however, to ensure a sufficiently high ion conductivity, it is usually necessary to heat solid electrolytes, or polymer composites or ceramic composites or polymer-ceramic composites, which do without the addition of liquid electrolytes, to relatively high temperatures, since the ion conductivity, for example, at room temperature, is too low. Usual temperatures at which the ion conductivity of the known solid electrolytes may be ensured range, for example, between 70° C. and 100° C. In order to be able to maintain a battery manufactured from a solid electrolyte at these temperatures and to prevent heat losses resulting from the dissipation of heat to the environment in the process, the conventional batteries are usually accommodated in an insulated battery housing. Conventional battery housings particularly effectively curb the heat loss through vacuum insulation or also through other insulation materials.

Another problem is heat loss, which occurs through cable ducts through the insulation, which pass through the battery housing into the interior space or out of the interior space of the battery housing. Cables or connections include data lines and power lines as well as ducts for the supply and discharge of a coolant (for example, water, air, etc.). The heat loss is particularly severe as a result of the very good heat conduction of the electrically conductive materials in the live cables (for example, copper), and may typically be on the same order as the heat loss through the insulation, here in particular, the vacuum insulation. In order to disrupt the dissipation of heat via the live cables, conventional contactors are able to curb but not fully eliminate the heat loss via the cables, since the contactor itself exhibits a certain thermal conductivity. A disruption of data lines is previously unknown, however, so that these invariably cause a heat loss, which cannot be prevented by the insulation material of the battery housing.

An object of the present invention, therefore, is to overcome at least partly the above disadvantages. An object of the present invention is, in particular, to reduce the heat losses, which arise in an insulated battery having a connection line at an elevated operating temperature.

SUMMARY

Features and details of the present invention result are described herein with reference to the figures. Features and details described in connection with the battery housing according to the present invention also apply in connection with the battery-operated device according to the present invention and in conjunction with the method according to the present invention for thermally insulating a battery having an elevated operating temperature and vice versa, respectively, so that invariably reference is or may be alternatingly made to the individual aspects of the present invention.

The battery housing according to the present invention including at least one interior space for accommodating at least one battery and including at least one contact element which, in a connection position, establishes a connection with a counter-contact element, the connection passing through the battery housing out of the interior space and/or into the interior space, and the connection being cut off in an out-of-contact position with the counter-contact element, includes the technical teaching that the counter-contact element is situated on an insulation component, which is movable relative to the battery housing, the insulation component being movable from a first position, in which the counter-contact element and the contact element are in the connection position, into a second position, in which the counter-contact element and the contact element are in the out-of-contact position, the contact element being thermally insulated in the out-of-contact position by the insulation component.

In this case, the insulation component is at least one component, with which the function of the cutoff of the connection and of insulating the contact position may be carried out. However, the insulation component may also be understood to mean two separate components, the one component fulfilling the function of the cutoff of the connection and the other component fulfilling the function of insulating the contact elements, which are advantageously mechanically connected to one another.

A battery within the meaning of the present invention is also to be understood to mean a storage battery (rechargeable battery), a high-energy battery and, in particular, a high-energy lithium (ion) battery, which has a polymeric or ceramic solid electrolyte.

The design of the battery housing according to the present invention offers the advantage that a dissipation of heat from the interior space of the battery housing is prevented by cutting off the connection, namely by cutting off the counter-contact element from the contact element in the out-of-contact position, and by thermally insulating the contact element in the out-of-contact position by the insulation component via the cut off connection and also via the end points of the connection, here in particular, via the contact surface of the contact element, which is covered by the insulation component in a thermally insulating manner. It is expressly pointed out that the cutoff of the connection is reversible, i.e., that the counter-contact element and the contact element are movable from the out-of-contact position back into the connection position, in order to restore the connection which passes through the battery housing.

A connection within the meaning of the present invention is to be understood to mean at least one cable, one data line or, for example, one coolant-conducting line or a combination of the aforementioned elements. In principle, a connection may also be understood to mean multiple connections, which pass through the battery housing into or out of the interior space, each of the connections being capable of fulfilling a different function, namely, for example, one connection represents a data line, the other connection represents a live cable and, for example, a third connection is a coolant line. In this case, the contact elements and the counter-contact elements of the cables, of the data lines and of the coolant-conducting lines are preferably designed in such a way that the contacts are separated and joinable again as a fully functional connection. The contact element, or contact elements, which form the connection to a respective counter-contact element in the connection position, is/are preferably situated in the battery housing, whereas the counter-contact element is advantageously situated on the movable insulation component. When the insulation component is moved from the first position which, in the present case, represents the connection position of the counter-contact element with the contact element, into the second position, the counter-contact element situated in the insulation component, together with the insulation component, is moved away from the contact element. Accordingly, the second position of the insulation component is to be equated with the out-of-contact position between the contact element and the counter-contact element. If the insulation component is moved into the second position, the contact element, which is located in the out-of-contact position with the counter-contact element, is preferably covered at its end by the insulation component, namely, at the contact surface to the counter-contact element, and is therefore thermally insulated according to the present invention. As previously described, an insulation component may also be understood to mean a second component which, with the first insulation component situated in the second position, is moved onto the contact element or the contact elements, and thereby thermally insulates the contact element. The movement of the first insulation component in this case from the first position into the second position may differ from the movement of the second insulation component which is used to thermally insulate the contact element.

Irrespective of whether the insulation component integrates both the function of cutting off the connection and insulating the contact points, or whether these functions are implemented by two insulation components, an ability to conserve heat energy in temperature-controlled batteries becomes possible for the first time with the present invention and makes the use of these batteries economically viable. This in turn enables the use of promising high energy systems, which are also characterized by an extraordinarily high intrinsic safety as a result of the solid electrolytes used.

In order to retain the heat in the interior space of the battery housing, i.e., the ambient heat of the battery in the interior space of the battery housing, the insulation component and/or the material coating the interior space is preferably formed, at least in sections, of a thermal insulation material, in particular, of a vacuum insulation material, and is pierced preferably only in the area of the connections. In order to achieve a complete thermal insulation, the battery housing is formed entirely of the thermal insulation material. In this case, the insulation material for the insulation component and for the battery housing may be materially different, may have a different thickness and may have different insulating properties.

To restore the connection, the insulation component is advantageously movable via a linear movement from the second position back into the first position. The movement in this case occurs advantageously in parallel to the battery housing and orthogonally to the connection, which is formed at least in the area of the battery housing and of the insulation component via the contact element and the counter-contact element. The linear movement from the second position back to the first position advantageously results in the movement from the first position into the second position also occurring linearly. A linear movement, which occurs in parallel to the battery housing and orthogonally to the connection may also be understood to mean a rotational movement of the insulation component. Irrespective of the linear movement of the insulation component, which occurs in parallel to the battery housing and orthogonally to the connection, and which serves to restore the connection of the lines or connections passing through the battery housing, the movement of a second insulation component which, with the first insulation component situated in the second position, is brought into the contact position with the contact element in order to thermally insulate the contact element, may also be a swiveling movement.

In order to reduce the assembly effort of the battery housing according to the present invention, for example, the insulation component is preferably integrally designed with the battery housing. An integral design in this case is understood to mean a one-piece design, or a structural unit assembled from the insulation component and the battery housing.

The insulation component or insulation a component is/are advantageously designed as plates, which are slidable, swiveling and/or rotatable relative to the battery housing. A plate is understood to mean a molded body having at least one plane, the plane, viewed at least macroscopically, preferably having a symmetrical, i.e., preferably planar surface. The at least one plane of the plate in this case points preferably in the direction of the battery housing, so that the plate, i.e., the insulation component, is slidable in parallel to the housing. A rotatably mounted plate is situated preferably in parallel to the battery housing, i.e. is situated in parallel to one of the outer shell surfaces of the battery housing and is rotatable in the position in parallel to the battery housing preferably at least over the area of the contact elements. Accordingly, via the rotation of the insulation component designed as a rotatable plate, the counter-contact element may, with the rotation of the plate, be brought into the connection position or into the out-of-contact position. In the out-of-contact position, the section of the rotatable plate, in which the counter-contact elements are not situated, may lie above the contact elements in a thermally insulating manner. If the insulation component is designed as a slidable plate, the plate is preferably guided on a retaining element, which supports the linear movement and the parallel guidance relative to the battery housing, and the contact position of the insulation component on the contact element. A retaining element may be understood to mean, for example, a guide rail or preferably also a rod, which is attached to the plate, the rod preferably also serving to slide, i.e. to move the plate.

In order to avoid an increased resistance between the contact element and the counter-contact element in the connection position as the result of a partially open connection, a force is applied to at least one contact element. In this case, a force is advantageously applied to the contact element by a spring element, which is used to place contact elements in the connection position on the counter-contact element in at least a force-fitting manner. Thus, in the connection position, the contact element is pressed against the counter-contact element, as a result of which a connection, i.e., the connection position between the contact element and the counter-contact element is optimally formed. In the out-of-contact position, the contact element, to which a force is applied, presses against the insulation component, which thermally insulates the contact element, the retaining element preferably holding the insulation component in the position in parallel to the battery housing. If, for example, the connection is a coolant line or cooling medium line, the application of force to the contact element, which is a part of the cooling medium line, serves to press the end of the contact element, namely, the open line, against the insulation component, which advantageously results in a sealing of the open end of the contact element.

The insulation component movable relative to the battery housing is advantageously operatively connected to an electromagnet and to a spring in such a way that the component is movable via a mechanism from the second position into the first position for establishing the connection when the electromagnet is energized. A mechanism, by way of example, may be understood to mean a rod, which is connected to the plate, the rod being moved by the magnet. However, a mechanism could also be understood to mean a lever, which is operated via the electromagnet. In the described embodiment of the insulation component as a rotatable plate, the rod may advantageously form the rotation axis about which the insulation component rotates. Irrespective of whether the insulation component as a plate is slidable and/or rotatable, the rotation of the rod by the electromagnet causes a return element, preferably a return spring, to be squeezed or compressed by pressure or torsion. The return element in this case remains in the described squeezed or compressed form as long as the electromagnet is in operation, i.e., the electromagnet is supplied with current. However, the magnet is supplied with current only as long as the battery, which is accommodated in the interior of the battery housing, is in operation. If the battery is taken out of operation, the operating current for the electromagnet is then lost, as a result of which the electromagnet is de-energized and the insulation component designed preferably as a plate is then moved from the first position into the second position by the return force of the return element, whereby the contact element and the counter-contact element are guided into the out-of-contact position and the connection is cut off. The insulation component in this case is also preferably slid or rotated over the contact elements via the return force of the return element in order to thermally insulate the contact element or contact elements.

The battery housing is preferably suitable for maintaining a battery temperature-controlled at an operating temperature of 20° C. to 1,000° C., i.e., curbing the heat loss as a result of the dissipation of heat from the interior space of the battery housing to the outside. The battery, which is temperature controlled in the battery housing according to the present invention, preferably has an operating temperature of 40° C. to 400° C. Temperatures for a battery having an operating temperature of 60° C. to 140° C. may be particularly preferably maintained in the battery housing according to the present invention or the heat dissipation for maintaining the operating temperature of the battery of 60° C. to 140° C. may be maintained in the interior space of the battery housing.

Another aspect of the present invention is a battery-operated device, which may be, in particular, a power tool, a garden tool, a computer, a notebook, a PDA, a mobile telephone, a hybrid vehicle, a plug-in-hybrid vehicle or an electric vehicle, in particular, a motor vehicle. To accommodate the battery, the device includes a battery housing having an interior space, in particular the battery housing according to the present invention. The battery-operated device in this case includes the technical teaching that when cutting off a connection passing through the battery housing into or out of the interior space by cutting off a contact element which forms the connection from a counter-contact element, the contact element is thermally insulatable at the contact surface to the counter-contact element by an insulation component. On the one hand, this approach offers the advantage that the previously described heat loss from the interior space of the battery housing via a cut off connection, namely, when the battery-operated device is non-operational, is prevented, as a result of which the battery power is maintained and, on the other hand, the battery-operated device may be operated with an efficient solid electrolyte battery. To avoid repetitions with respect to the advantages of the battery-operated device according to the present invention, reference is made to the description of the advantageous embodiment of the battery housing according to the present invention and is resorted to in its entirety.

A method according to the present invention for thermally insulating a battery having an elevated operating temperature is characterized by the following method steps, whereby these steps may follow one another in an order other than the order described below. A battery, which operates at an elevated temperature is accommodated in a thermally insulating battery housing, in particular, in the battery housing according to the present invention, in the interior space of the battery housing. In order to avoid heat losses when the battery is non-operational, at least one connection passing into the interior space or out of the interior space is cut off as a result of the cutoff of at least one contact element from a counter-contact element. The counter-contact element in this case is preferably situated on an insulation component movable relative to the battery housing, which is moved linearly from a first position, in which the counter-contact element and the contact element are in the connection position, into a second position in parallel to the battery housing and orthogonally to the connection. Upon movement of the insulation component into the second position, the counter-contact element and the contact element are brought into the out-of-contact position. The movement of the insulation component takes place preferably automatically and advantageously without current via a mechanical return element. In a following step, the contact element is thermally insulated at the contact surface to the counter-contact element by at least one insulation component. This component is moved onto the contact surface of the contact element in the area of the connection. If the battery is set into operation again, for example, by applying a charge current, the connection is restored by coupling the contact element to the counter-contact element. The restoration preferably takes place via a linear movement of the insulation component from the second position back into the first position. The insulation component in this case is guided in parallel to the battery housing and orthogonally to the connection.

When restoring the connection, a force is advantageously applied to the return element in such a way that the connection is automatically cut off when the battery is non-operational.

To avoid repetitions here with respect to the advantages of the method according to the present invention, reference is made to the description of the advantageous embodiment of the battery housing according to the present invention and of the battery-operated device according to the present invention, and is resorted to in its entirety.

Additional measures improving upon the present invention are presented in greater detail below with the description of a preferred exemplary embodiment of the present invention with reference to the figures. In doing so, the features mentioned in the description may be essential to the present invention, each individually or in arbitrary combination. It should be noted here that the figures are of descriptive character only and are not intended to restrict the present invention in any form.

BRIEF DESCRIPTION OF THE DRAWINGS

Identical parts in the different figures are consistently provided with the same reference numerals, for which reason these are generally described only once.

DETAILED DESCRIPTION OF EXAMPLE EMBODIMENTS

Figure 1:
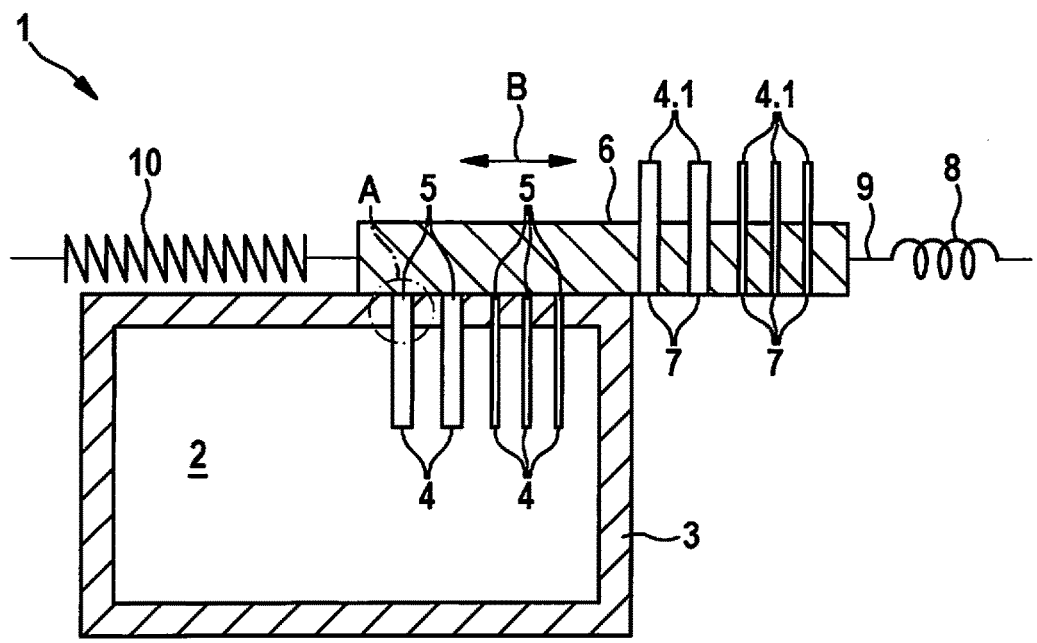
FIG. 1 schematically shows a sectional view of one specific embodiment of a battery housing according to the present invention including cut off connections, which pass into the interior space and out of the interior space of the battery housing.

FIG. 1 schematically shows one specific embodiment of a battery housing 1 according to the present invention. Battery housing 1 is usable, for example, for stationary or mobile applications. Battery housing 1 according to the present invention may be part of a battery-operated device or may be installed in the battery-operated device, in particular, in a power tool, a garden tool, a computer, a notebook, a PDA or a mobile telephone. The battery-operated device may, in particular, be used in a hybrid vehicle, a plug-in-hybrid vehicle or an electric vehicle, i.e., in a motor vehicle.

Figure 2:
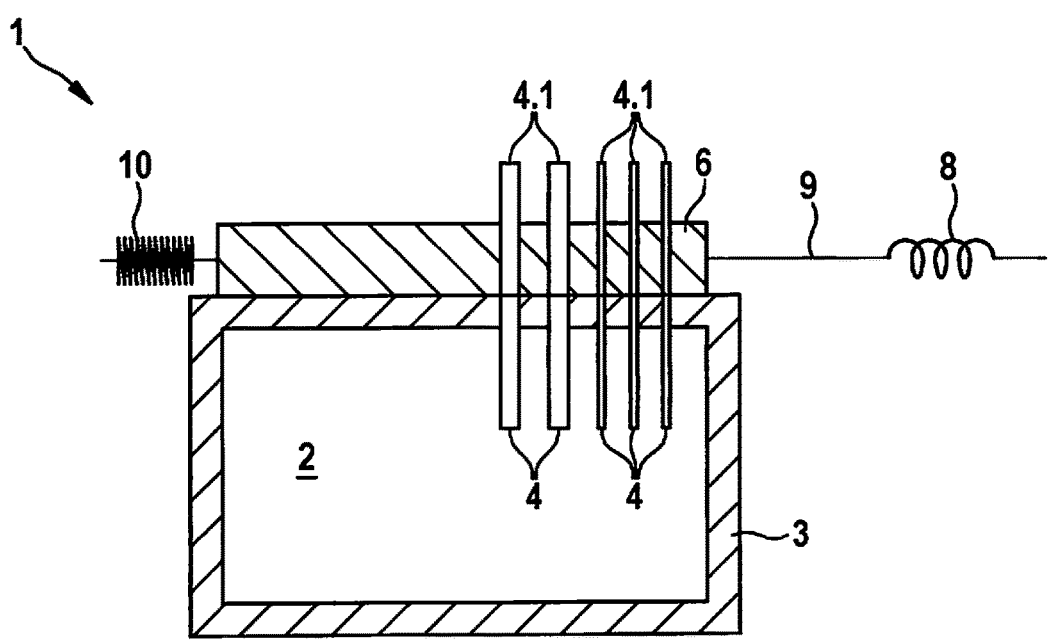
FIG. 2 schematically shows a diagram of the specific embodiment in FIG. 1 in a connection position, in which the lines passing into or out of the interior space are connected.

Battery housing 1 includes an interior space 2, which is used to accommodate at least one battery, not depicted here. The battery may be, in particular, a lithium battery or a lithium-ion battery, which has a polymeric or ceramic solid electrolyte instead of a liquid electrolyte. The operating temperatures normal for this battery are preferably in the range of 60° C. to 140° C. Battery housing 1, which is depicted here in a sectional representation in a top view from the front, is formed by a wall 3 enclosing interior space 2 at least in sections, which in the present case is double-walled, and which is made of an insulation material. Here, wall 3 is preferably made of a vacuum insulation material. Wall 3 of the battery housing is interrupted in the upper right section by five variously thickly designed connections 4, the number of five connections 4 being merely exemplary here. Connections 4 may be cables, data lines, media lines or coolant lines, which pass into or out of interior space 2. A connection 4 may be a power cable, for example, which supplies the battery with a charge current, for example. Connections 4 end up in the out-of-contact position depicted here in FIG. 1 in contact elements 5, left contact element 5 being depicted by way of example in a detailed view of detail A in FIG. 3. A movable/slidable insulation component 6 designed as a plate is situated on the upper wall of battery housing 1. Double arrow B depicted above insulation component 6 represents the movement direction of insulation component 6. A movement, i.e., a sliding of insulation component 6 takes place linearly, in parallel guidance to battery housing 1, above battery housing 1 as depicted herein. Counter-contact elements 7, which contact contact elements 5 in the connection position depicted in FIG. 2, are situated in insulation component 6 designed as a plate. Counter-contact elements 7 are continued in connections 4.1, which correspond to connections 4. Counter-contact elements 7 in this case are to be understood to mean contact surfaces or elements, which make contact with contact elements 5 in the connection position. Accordingly, counter-contact element 7 may also be understood to mean a connection 4.1 capped in the area of the contact surface at the contact elements, the end of which is joined with contact element 5 in the connection position. In the out-of-contact position depicted herein, insulation component 6 designed as a plate is located in a second position, counter-contact elements 7 being slid to the right relative to contact elements 5. The sliding of insulation component 6 to the right advantageously takes place when the battery accommodated in interior space 2 is non-operational. When the battery is taken out of operation, i.e., when the power supply is interrupted, an electromagnet 8, which is connected by a mechanism 9, here by a rod, to insulation component 6, is preferably also de-energized. A return element 10 is situated on the side of insulation component 6 opposite mechanism 9 and electromagnet 8 and is connected to insulation component 6. Return element 10 is designed as a return spring in the specific embodiment depicted herein. As depicted in FIG. 2, a force is applied to return element 10 in the connection position by the movement transmitted by mechanism 9 onto insulation component 6, and is squeezed or compressed. In the process, the energized electromagnet 8 maintains return element 10 in the squeezed or compressed form. As a result, return element 10 designed as a return spring is reset when electromagnet 8 is de-energized (FIG. 1) and in the process automatically slides insulation component 6 designed as a plate into the second position, i.e., into the position of contact elements 5 out-of-contact with counter-contact elements 7. This movement takes place in a direction opposite the movement of insulation component 6 carried out by electromagnet 8 via mechanism 9. Accordingly, the movement of insulation component 6 imparted by the return element in the specific embodiment shown herein is linear and in parallel to the battery housing and orthogonally to connections 4 and 4.1. During the sliding of insulation component 6, an insulation section formed here in the illustration to the left of counter-contact elements 7 is slid into the area of connections 4 and 4.1 onto the contact surface of contact elements 5 and thereby thermally insulates contact elements 5 in the out-of-contact position, i.e. when connections 4 and 4.1 are cut off. Because the section or part of insulation component 6 designed as a movable plate, which is made exclusively of insulation material, is slid onto contact positions 5, a direct heat loss via contact elements 5 is prevented when connections 4 and 4.1 are cut off. As a result, the heat loss via cable, lines, etc. or via the ends thereof, which are the contact surfaces of contact elements 5, may be significantly reduced. This position of insulation component 6, namely, the thermal insulation of contact elements 5 is, as previously described, automatically adjustable via return element 10, namely, during standstill, i.e., when the battery is non-operational, the non-operational state of the battery accounting for the majority of the time.

FIG. 2 shows battery housing 1 in a connection position, connections 4 and 4.1 being connected to one another via contact elements 5 and counter-contact elements 7. In the connection position, insulation component 6 designed as a plate is located in the first position. For this purpose, insulation component 6 is slid to the left from the second position depicted in FIG. 1. Insulation component 6 is slid or moved into the connection position, i.e., into the first position via energized electromagnet 8, which moves mechanism 9 designed as a rod, which is connected to insulation component 6, to the left. As a result of the linear movement imparted by mechanism 9, insulation component 6 designed as a plate also moves linearly and in parallel to battery housing 1, i.e., in the present case also orthogonally to connections 4 and 4.1 to the left. As a result of the sliding or the movement of insulation component 6, to the left as depicted herein, a force is applied to return element 10 designed as a return spring and the return spring is compressed as a result. In position 1 of insulation component 6, i.e., in the connection position of contact elements 5 with counter-contact elements 7, the battery is in operation, which means, for example, that the battery is charged via a charge current in the charge cycle or the battery is delivering energy to a consumer via a live line or live connection.

Figure 3:
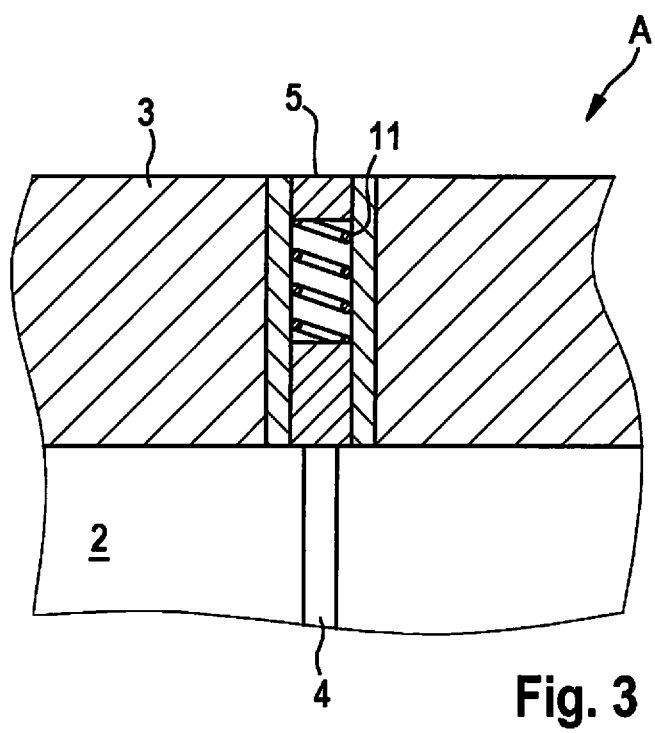
FIG. 3 shows a detail of a contact element, to which a force is applied by a spring element.

In order to eliminate a high resistance at the contact points between contact elements 5 and counter-contact elements 7 caused by a minimal gap between contact elements 5 and counter-contact elements 7 in the connection position, it is advantageous, as depicted in FIG. 3, to apply force to the connections of the live lines at the contact points, i.e., at contact elements 5. A force may be applied to contact elements 5, for example, by a spring element 11. In the connection position, i.e., in the contact position between contact element 5 and counter-contact element 7, spring element 11 may press contact element 5 optimally against counter-contact element 7. In this way, an increased resistance due to an undesirable gap formation at the contact point between counter-contact element 7 and contact element 5 may be avoided. In the out-of-contact position, spring element 11, due to the covering of the contact element by an insulation component 6, presses against insulation component 6 only from below, here, in particular, against the insulation section formed on the insulation component, which in the out-of-contact position rests on contact elements 5 for thermal insulation. To avoid a lifting of insulation component 6 designed as a plate, insulation component 6 is preferably retained via mechanism 9 or via an additional holder or retaining element on battery housing 1.

Insulation component 6 which, as depicted here, also includes an insulation section, and on which counter-contact elements 7 are also situated, may be implemented by two insulation components. In this case, the connection may be cut off by sliding the one insulation component 6 (as depicted in FIG. 1). A second insulation component may then be slid/moved or swiveled onto contact elements 5 in or, by way of example, also orthogonally to the directions depicted by double arrow B.

What is claimed is:

1. A battery housing including at least one interior space for accommodating a battery, and including at least one contact element and a counter-contact element, wherein the counter-contact element is situated on an insulation component which is movable relative to the battery housing, the insulation component being movable from a first position, in which the counter-contact element and the contact element are in a connection position, into a second position, in which the counter-contact element and the contact element are in an out-of-contact position, wherein in the connection position, the contact element and the counter contact element together establish a connection, passing through the battery housing, between the interior space of the battery housing and external to the battery housing, the connection being an electrical connection, or a data connection, or a fluid connection, and wherein in the out-of-contact position, the connection is cut off and the contact element is thermally insulated by the insulation component.

2. The battery housing as recited in claim 1, wherein at least one of the insulation component and a material coating the interior space, is formed, at least in sections, from a thermal insulation material, the thermal insulation material being a vacuum insulation material.

3. The battery housing as recited in claim 1, wherein to restore the connection, the insulation component is movable via a linear movement from the second position back into the first position, the movement taking place in parallel to the battery housing and orthogonally to the connection.

4. The battery housing as recited in claim 1, wherein the insulation component is integrally formed with the battery housing.

5. The battery housing as recited in claim 1, wherein the insulation component is a plate, which is at least one of slidable and rotatable, relative to the battery housing.

6. The battery housing as recited in claim 1, further comprising a spring element, the spring configured to apply a force to the contact element, wherein in the connection position, the contact element abutting the counter-contact element in at least a force-fitting manner.

7. The battery housing as recited in claim 1, wherein the insulation component is operationally connected to an electromagnet and to a return spring in such a way that the insulation component is movable from the second position into the first position for establishing the connection via a mechanism when the electromagnet is energized and a force is applied to the return element, and the insulation component is movable from the first position into the second position as a result of the return force of the return element and cuts off the connection when the electromagnet is de-energized.

8. The battery housing as recited in claim 1, wherein a battery having an operating temperature of 20° C. to 1,000° C. is accommodated in the interior space.

9. The battery housing as recited in claim 1, wherein a battery having an operating temperature of 40 C. to 400 C. is accommodated in the interior space.

10. The battery housing as recited in claim 1, wherein a battery having an operating temperature of 60° C. to 140° C. is accommodated in the interior space.

11. A battery-operated device, including a battery housing having an interior space for accommodating a battery, including at least one contact element and a counter-contact element, wherein the counter-contact element is situated on an insulation component which is movable relative to the battery housing, the insulation component being movable from a first position, in which the counter-contact element and the contact element are in a connection position, into a second position, in which the counter-contact element and the contact element are in an out-of-contact position, wherein in the connection position, the contact element and the counter contact element together establish a connection, passing through the battery housing, between the interior space of the battery housing and external to the battery housing, the connection being an electrical connection, or a data connection, or a fluid connection, and wherein in the out-of-contact position, the connection is cut off and the contact element is thermally insulated by the insulation component.

12. The battery-operated device as recited in claim 11, wherein the device is one of a power tool, a garden tool, a computer, a notebook, a PDA, a mobile telephone, a hybrid vehicle, a plug-in hybrid vehicle, an electric vehicle, or an electric motor vehicle.

13. A method for thermally insulating a battery having an elevated operating temperature, comprising:

accommodating the battery in an interior space of a thermally insulated battery housing, the battery housing including at least one contact element and a counter-contact element which, in a connection position of the counter-contact element and the contact element, the counter-contact element and the contact element together establish a connection, passing through the battery housing, between the interior space of the battery and external to the battery, the connection being an electrical connection, or a data connection, or a fluid connection, and the connection being cut off when the counter-contact element and the contact element are in an out-of-contact position;

cutting off the connection passing between the interior space of the battery housing and external to the battery housing as a result of the cutoff of the contact element from a counter-contact element when the battery is taken out of operation, the counter-contact element being situated on an insulation component movable relative to the battery housing, which is moved linearly from a first position, in which the counter-contact element and the contact element are in the connection position, into a second position in parallel to the battery housing and orthogonally to the connection, in which the counter-contact element and the contact element are in the out-of-contact position;

thermally insulating the contact element at a contact surface of the contact element by the insulation component, the thermally insulating component being moved onto the contact surface of the contact element, wherein the contact surface is a surface of the contact element that contacts the counter-contact element when the counter-count element and the contact element are in the connection position; and restoring the connection by coupling the contact element to the counter-contact element when putting the battery into operation via a linear movement of the insulation component from the second position back into the first position, the insulation component being guided in parallel to the battery housing and orthogonally to the connection.

* * * * *